US008935987B2

(12) United States Patent
Edwards et al.

(10) Patent No.: US 8,935,987 B2
(45) Date of Patent: Jan. 20, 2015

(54) APPARATUS FOR INCREASING THE VISIBILITY OF AN AIRCRAFT WINGLET (71) Applicant: Aviation Applications Corporation, Billings, MT (US)

(72) Inventors: John W. Edwards, Billings, MT (US); Alexander Christopher Edwards, Billings, MT (US); Perry Keith Jones, Billings, MT (US)

(73) Assignee: Aviation Applications Corporation, Billings, MT (US)

( * ) Notice: Subject to any disclaimer, the term of this patent is extended or adjusted under 35 U.S.C. 154(b) by 292 days.

(21) Appl. No.: 13/714,893

(22) Filed: Dec. 14, 2012

(65) Prior Publication Data
US 2014/0165902 A1 Jun. 19, 2014

(51) Int. Cl.
B64D 45/00 (2006.01)
B64D 47/00 (2006.01)
G01D 13/00 (2006.01)

(52) U.S. Cl.
CPC ............... G01D 13/00 (2013.01); B64D 45/00 (2013.01)
USPC ........................................ 116/28 R; 244/1 R (58) Field of Classification Search
CPC ........ B64D 45/00; B64D 47/00; B64D 47/02; G01D 13/08; G08B 5/02
USPC ................. 116/1, 28 R, 30, 32, 203; 160/10; 244/1 R, 117 R, 129.1
See application file for complete search history.

(56) References Cited

U.S. PATENT DOCUMENTS

| 2,609,164 | A | 11/1952 | Dillon |
| 3,044,516 | A | 7/1962 | Stoll |
| 4,598,883 | A | 7/1986 | Suter |
| 4,606,516 | A | 8/1986 | Willison |
| 4,632,340 | A | 12/1986 | Duea |
| 4,998,687 | A | 3/1991 | Gorman |
| 5,282,587 | A | 2/1994 | Rodyniuk et al. |
| 5,340,055 | A | 8/1994 | Rodyniuk et al. |
| 5,611,501 | A | 3/1997 | Crandley |
| 5,845,873 | A | 12/1998 | Millard |
| 6,109,872 | A | 8/2000 | McCausland |
| 6,176,450 | B1 * | 1/2001 | Bergman ............... 244/1 R |
| D475,341 | S * | 6/2003 | Garland ............... D12/345 |
| 6,749,151 | B1 | 6/2004 | Ross |
| 6,835,045 | B1 | 12/2004 | Barbee et al. |

(Continued)

FOREIGN PATENT DOCUMENTS

CN 201703565 U * 1/2011 ............ B64D 47/00

OTHER PUBLICATIONS

Internet screen shot of TRISOFT Aircraft Covers' Wing Tip Protection page (found at http://www.trisoftcovers.com/Wing_Tips.html).

Primary Examiner — R. A. Smith
(74) Attorney, Agent, or Firm — Antoinette M. Tease (57) ABSTRACT An apparatus for increasing the visibility of an aircraft winglet comprising a saddle piece configured to fit on top of a winglet, the saddle piece comprising a horizontal strap configured to fit around a trailing edge of the winglet, an anchor member comprising a horizontal strap configured to fit around a trailing edge of the winglet, and an adjustable strap connecting the saddle piece to the anchor member. The anchor member is situated on the winglet a certain distance below the saddle piece, and the adjustable strap adjusts the vertical distance between the saddle piece and the anchor member.

16 Claims, 5 Drawing Sheets

(56) References Cited

U.S. PATENT DOCUMENTS

| | | | |
|---|---|---|---|
| 7,401,570 B2 * | 7/2008 | Moore ........................... | 116/32 |
| 8,033,791 B1 | 10/2011 | Watanabe | |
| 8,057,176 B2 | 11/2011 | Wobben | |
| 8,641,106 B2 * | 2/2014 | Probasco et al. .............. | 292/288 |
| 2008/0017098 A1 | 1/2008 | Moore | |
| 2008/0282590 A1 | 11/2008 | Wobben | |

* cited by examiner

APPARATUS FOR INCREASING THE VISIBILITY OF AN AIRCRAFT WINGLET

BACKGROUND OF THE INVENTION

1. Field of the Invention

The present invention relates generally to aircraft and, more specifically, to an apparatus that is placed onto and around the winglet of an aircraft to allow the winglets to be better perceived visually from all angles.

2. Description of the Related Art

On certain aircraft, the winglets can be difficult to see from the cockpit or the ground, particularly when they are in a hangar. To avoid property damage and/or injury to persons, there is a need for a system that will allow winglets to be easily visible from any vantage point. Such a system would also allow storage capacity within the hanger to be maximized without damaging aircraft. The present invention enables the location and dimensions of a winglet to be discerned from the cockpit or the ground, whether the aircraft is stationary or being moved.

There are a number of issued patents for inventions whose purpose is to mark, protect or cover an aircraft wing or other part of an aircraft. Examples of such inventions include: U.S. Pat. No. 2,609,164 (Dillon, 1950), which discloses a cover for aircraft engines; U.S. Pat. No. 3,044,516 (Stoll, 1962), which provides a protective cover for aircraft wings and empennage control surfaces; U.S. Pat. No. 4,598,883 (Suter, 1986), which describes an apparatus for protecting the exterior of an aircraft, the apparatus comprising a plurality of elastomeric foam members; U.S. Pat. No. 4,606,516 (Willison, 1986), which discloses a protective device for covering an airplane wing comprising a laminate having a water-impervious dense outer layer and a less dense inner layer, the laminate providing impact resistance to prevent damage to the airplane wing; U.S. Pat. No. 5,282,587 (Rodyniuk et al., 1994) and U.S. Pat. No. 5,340,055 (Rodyniuk et al., 1994), which provide an aircraft wing cover comprised of a lightweight, ultraviolet stabilized material that is resistant to propagation of tears and does not absorb water; U.S. Pat. No. 5,611,501 (Crandley, 1997), which describes an aircraft wing protective cover system comprising a cover sheet configured to overlie the upper surface of an aircraft wing, a pocket formed at an outer end of the cover sheet for receiving a tip of the wing, and perimeter strips attached to and extending along the perimeter of the cover sheet; U.S. Pat. No. 5,843,873 (Millard, 1998), which discloses a cover for large aircraft critical surfaces, the cover comprising a flexible material that covers the top surface of an aircraft wing and first and second sets of attachment straps; U.S. Pat. No. 6,109,872 (McCausland, 2000), which provides a helicopter rotor cover system comprised of a main rotor cover and a tail rotor cover, a tubular member connected the enclosed spaces of the two covers, and a hot air blower to blow hot air into the two covers; and U.S. Pat. No. 6,835,045 (Barbee et al., 2004), which describes a cover for helicopter rotor blades, the cover being in the shape of a flexible, elongate tube, and the inner surface of the cover being coated with aluminum, titanium or other metals or alloys to prevent the rotor blades from absorbing the sun's infrared rays. Only U.S. Pat. No. 7,401,570 (Moore, 2008) attempts to solve a problem similar to that solved by the present invention. Moore's marker is designed to make an aircraft wing tip more visible, but his invention is structurally dissimilar to the present invention.

Additionally, U.S. Pat. No. 4,632,340 (Duea, 1986) and U.S. Pat. No. 4,998,687 (Gorman, 1991) both involve removable spoilers for reducing the wing lift of a parked aircraft. U.S. Pat. No. 6,749,151 (Ross, 2004) discusses a portable aircraft hangar assembly for aircraft with a series of rotor blades. The assembly includes rotor sleeves that are slid over the ends of each rotor blade and connected to a canopy that is positioned over the series of rotor blades.

U.S. Pat. No. 8,033,791 (Watanabe, 2011) discloses a protective bag for protecting the end portions of the blades on a wind turbine. U.S. Pat. No. 8,057,176 (Wobben, 2011) provides a marker (in the form of a sheath) that is installed over the blade of a wind turbine to identify it as an aviation obstruction.

BRIEF SUMMARY OF THE INVENTION

The present invention is an apparatus for increasing the visibility of an aircraft winglet comprising: a saddle piece configured to fit on top of a winglet, the saddle piece comprising a horizontal strap configured to fit around a trailing edge of the winglet when the saddle piece is installed on the winglet; an anchor member comprising a horizontal strap configured to fit around a trailing edge of the winglet when the anchor member is installed on the winglet; and an adjustable strap connecting the saddle piece to the anchor member; wherein the anchor member is situated on the winglet a certain distance below the saddle piece, wherein there is a vertical distance between the saddle piece and the anchor member, and wherein the adjustable strap adjusts the vertical distance between the saddle piece and the anchor member. In a preferred embodiment, the horizontal strap on the saddle piece is both adjustable and elastic.

In yet another preferred embodiment, the saddle piece further comprises a vertical pocket, and the apparatus further comprises an upwardly extending stick flag having a shaft that fits into the vertical pocket. Preferably, the invention further comprises a downwardly extending hanging flag that is attached to the saddle piece. Alternately, the invention further comprises a downwardly extending hanging flag that is removably attached to the saddle piece.

In a preferred embodiment, the adjustable strap comprises a first end and a second end; wherein the saddle piece comprises a top, a first side and a second side; wherein the anchor member comprises a first side and a second side; wherein the first end of the adjustable strap is fixedly attached to the second side of the anchor member; wherein the adjustable strap extends upward through one or more loops attached to the second side of the saddle piece, over the top of the saddle piece, and through one or more loops attached to the first side of the saddle piece; wherein the second end of the adjustable strap terminates in a buckle; wherein the buckle comprise a first part and a second part; and wherein the first part of the buckle is attached to the second end of the adjustable strap, and the second part of the buckle is attached to the first side of the anchor member.

In a preferred embodiment, the anchor member comprises a center portion, and the center portion of the anchor member comprises a neon strip with a reflective stripe configured so that when the anchor member is installed on the winglet, the neon strip and reflective stripe extend vertically along a leading edge of the winglet. Preferably, the horizontal strap of the anchor member is comprised of a neon strip with a reflective stripe configured so that when the anchor member is installed on the winglet of an aircraft with a front and a rear, the neon strip and reflective stripe are visible from the rear of the aircraft.

In a preferred embodiment, the saddle piece comprises a front end and a rear end, and the front end of the saddle piece is wider than the rear end of the saddle piece. Preferably, the front end of the saddle piece comprises two wings, the winglet comprises a top with a leading edge, and each wing hugs a side of the leading edge of the top of the winglet when the apparatus is installed on the winglet.

In a preferred embodiment, the anchor member is roughly triangular in shape. Preferably, the anchor member has a top edge with a center, and the anchor member composes an outward bow at the center of the top edge of the anchor member. Preferably, the triangular shape of the anchor member has a bottom point, and the anchor member further comprises a neon strip with a reflective stripe that extends from the outward bow at the center of the top edge of the anchor member to the bottom point of the triangular shape of the anchor member.

In a preferred embodiment, the saddle piece comprises three neon strips with reflective stripes, one strip being positioned horizontally on a first side of the saddle piece, one strip being positioned horizontally on a second side of the saddle piece, and one strip being positioned along a center of the saddle piece. Preferably, the saddle piece and anchor member each comprises an inner surface, and the inner surfaces of the saddle piece and anchor member are comprised of an extrusion coating that is abrasion-resistant, chemical-resistant and moisture-resistant. The horizontal strap of the anchor member preferably comprises a hook-and-loop fastener that allows the length of the horizontal strap to be adjusted.

REFERENCE NUMBERS

1 Winglet
2 Saddle piece
2a Front end (of saddle piece)
2b Rear end (of saddle piece)
2c Horizontal strap (of saddle piece)
2d Buckle (of horizontal strap)
2e Neon strip
2f Reflective stripe
3g Buckle
2g Wing (of saddle piece)
3 Anchor member
3a Front end (of anchor member)
3b Rear end (of anchor member)
3c Horizontal strap (of anchor member)
3d Top edge (of anchor member)
3e Neon strip
3f Reflective stripe
3g Buckle
4 Strap
5 Static wick
6 Upwardly extending stick flag
6a Shaft (of upwardly extending stick flag)
7 Downwardly extending hanging flag
8 Pocket (for upwardly extending stick flag)
9 Buckle (for downwardly extending hanging flag)
10 Loop
11 Buckle (of strap)
12 Central loop
13 Side loop
14 Central loop

DETAILED DESCRIPTION OF INVENTION

The present invention is an apparatus comprising a saddle piece and an anchor member that are connected to each other with an adjustable strap. The apparatus fits onto and around the winglet of an aircraft as shown in FIGS. 1-5. The saddle piece fits on top of the winglet, and the anchor member fits around the winglet a certain distance below the saddle piece. The apparatus is configured for use with winglets both with and without static wicks located on the trailing edge of the winglet. The saddle piece and anchor member are preferably neon in color and striped with reflective material. The saddle piece identifies the top of the winglet, and the anchor member creates a snug fit around a lower portion of the winglet, thereby anchoring the apparatus on the winglet. The color and surface area of the apparatus make it extremely visible and readily identifiable.

In a preferred embodiment, the invention comprises both an upwardly extending stick flag and a downwardly extending hanging flag. The downwardly extending flag may be comprised of any durable material of a highly visible color; for example, it could be comprised of the same material as the neon strip 2e, 3e and reflective stripe 2f, 3f used on the saddle piece 2 and anchor member 3. The upwardly extending stick flag provides height and clearance detection above the winglet. The downwardly extending hanging flag provides a reference point for identifying the distance by which the tip of the winglet extends outward from the base length of the wing. These and other aspects of the invention are described more fully below.

Figure 1:
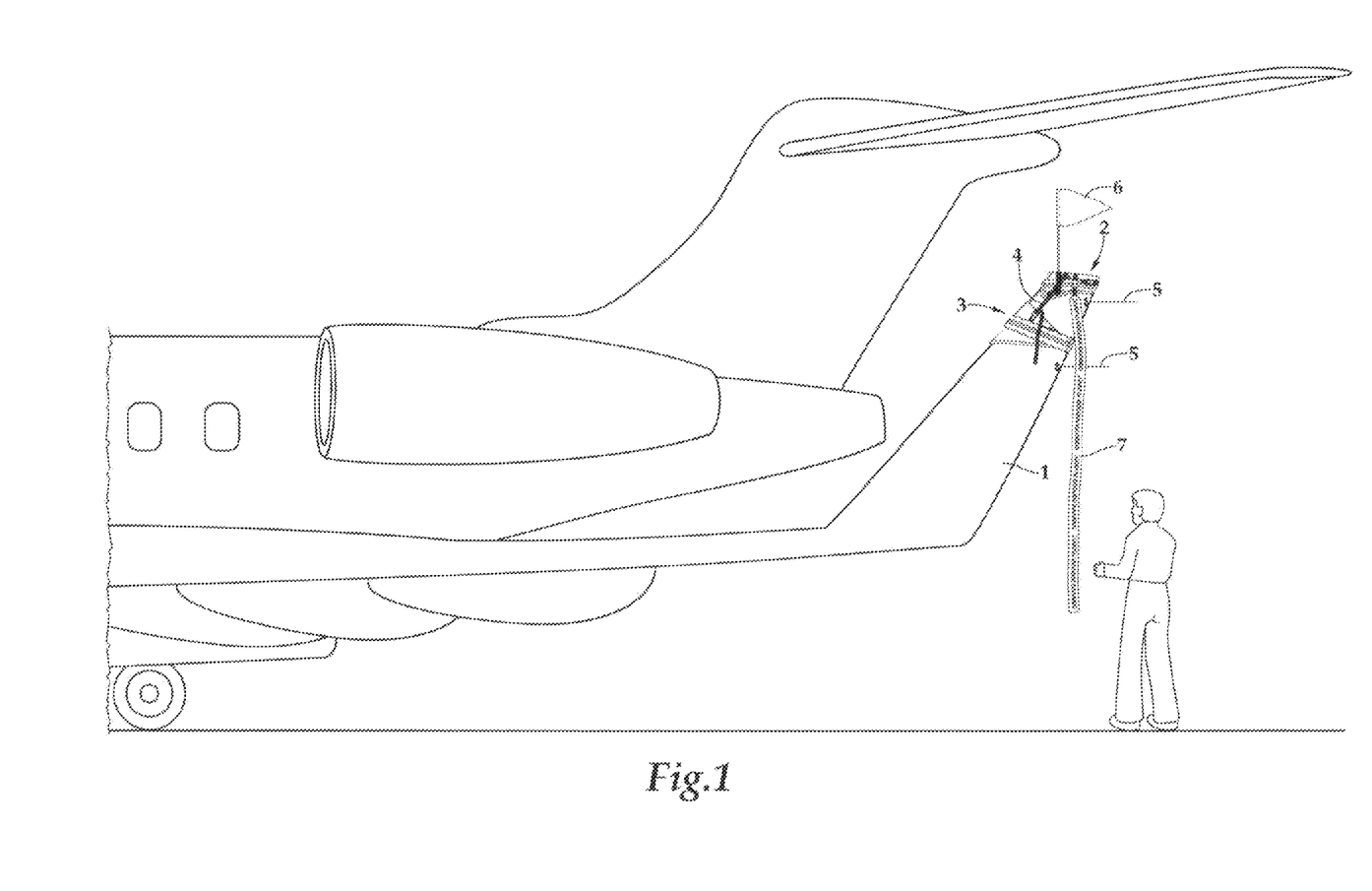
FIG. 1 is a perspective view of the present invention installed on the winglet of an aircraft.

FIG. 1 is a perspective view of the present invention installed on the winglet 1 of an aircraft. As shown in this figure, the present invention comprises a saddle piece 2 that straddles the top of the winglet 1, an anchor member 3 that surrounds the winglet a certain distance down the winglet from the saddle piece 2, and a strap 4 connecting the saddle piece 2 and anchor member 3. The strap 4 is adjustable so that the distance between the saddle piece 2 and the anchor member 3 can be increased or decreased to achieve the best fit on the winglet 1.

Note that the winglet shown in FIG. 1 comprises two static wicks 5. The present invention is specifically designed so that it can be used on winglets with or without static wicks 5. This is accomplished by:

providing a two-piece apparatus (with space between the saddle piece 2 and the anchor member 3 to accommodate one or more static wicks 5);

minimizing the surface area of the invention on the trailing edge of the winglet (this is done by maximizing the size of the anchor member 3 toward the front end 3*a* and minimizing it toward the rear end 3*b*; this is also done by making the rear end 2*b* of the saddle piece 2 shorter in height than the front end 2*a* of the saddle piece 2); and making the vertical distance between the saddle piece 2 and the anchor member 3 adjustable so that the rear portion 3*b* of the anchor member can fit between the static wicks 5.

Because of these same structural features, the present invention can also accommodate different spacing between static wicks 5.

Figure 9:
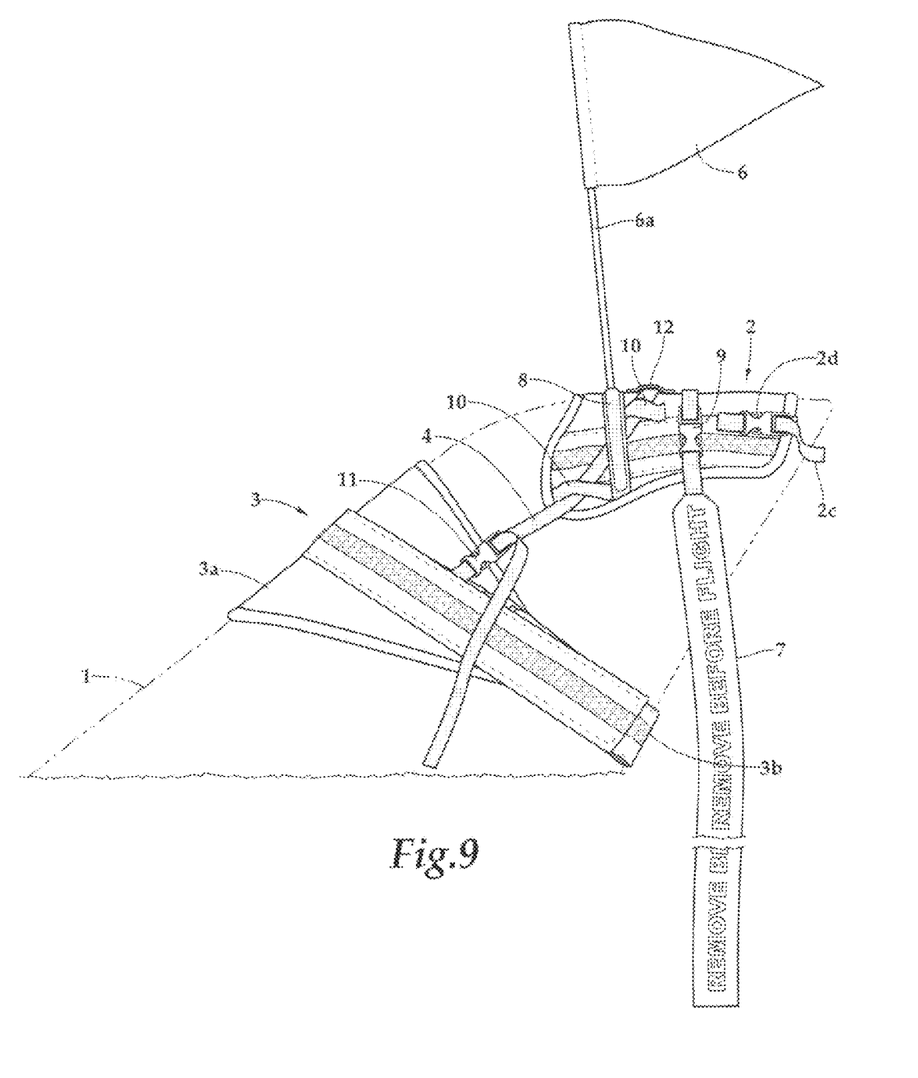
FIG. 9 is a side view of the present invention installed on the winglet of an aircraft wherein the drop in angle on the leading edge is more severe than that shown in figures 1-8.

In addition, the adjustability of the present invention allows it to be used with virtually all winglet sizes and shapes. Because of the two-piece design of the present invention and the adjustability incorporated therein, the present invention could be used on a winglet in which the drop in angle on the leading edge is more severe than that shown in FIGS. 1-8 (see FIG. 9).

FIG. 1 also shows the optional upwardly extending stick flag 6 and downwardly extending hanging flag 7. Both flags are preferably removable. These features are shown in greater detail in subsequent figures.

Figure 2:
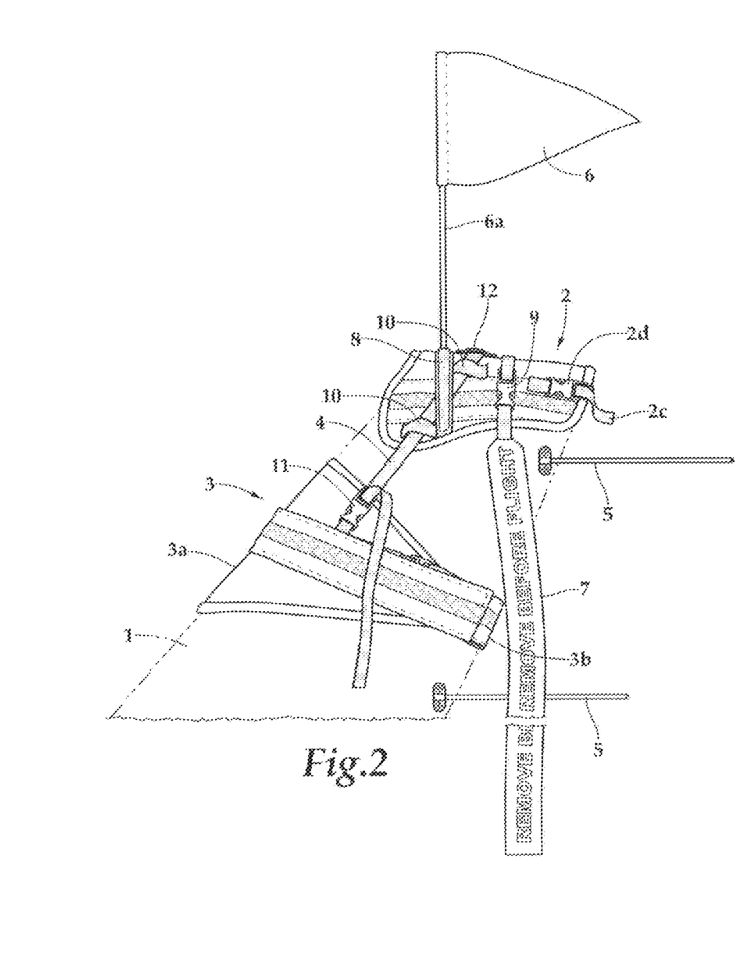
FIG. 2 is a first side view of the present invention installed on the winglet of an aircraft.

FIG. 2 is a first side view of the present invention installed on the winglet of an aircraft. As shown in this figure, the saddle piece 2 preferably comprises a vertical pocket 8 into which the shaft 6*a* of the upwardly extending stick flag 6 is inserted. In this manner, the upwardly extending stick flag 6 is easily removed.

Figures 5, 6A, 6B, 6C:
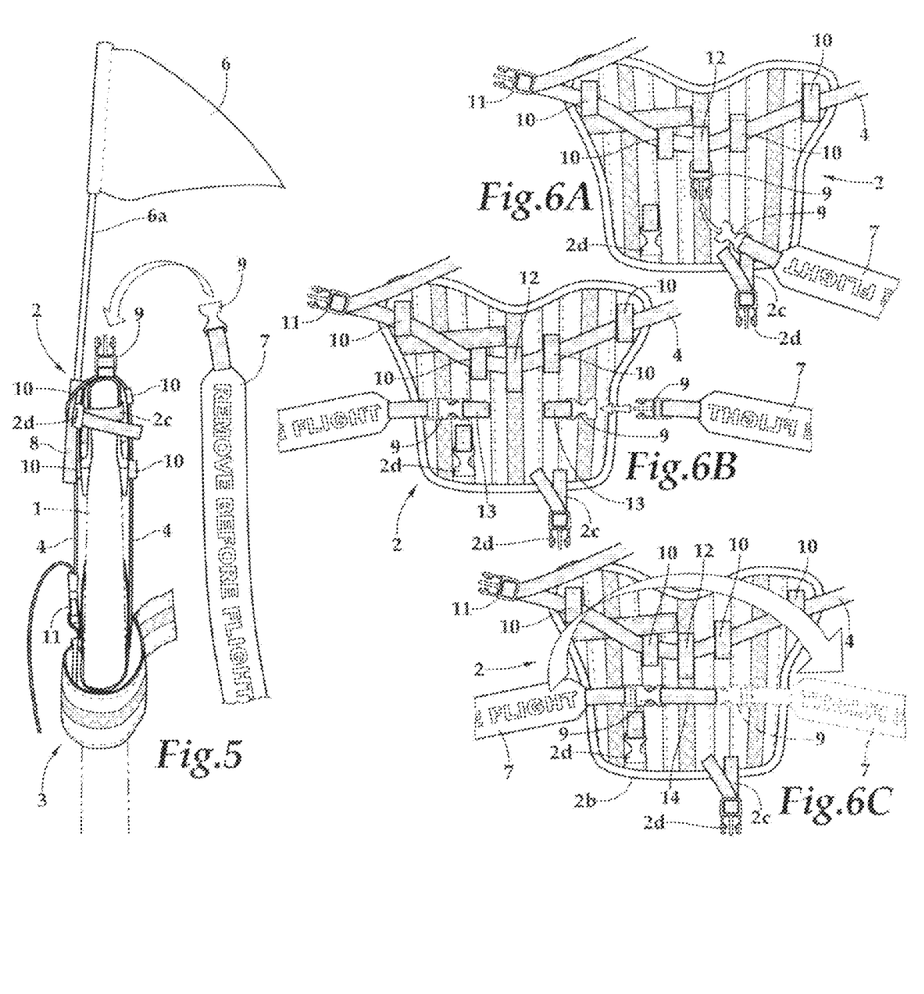
FIG. 5 is a rear view of the present invention installed on the winglet of an aircraft.
FIG. 6A is a front plan view of a first embodiment of the saddle of the present invention.
FIG. 6B is a front plan view of a second embodiment of the saddle of the present invention.
FIG. 6C is a front plan view of a third embodiment of the saddle of the present invention.

The downwardly extending hanging flag 7 is preferably attached to the saddle piece 2 via a buckle 9 that is fixedly attached to the saddle piece 2. FIGS. 6A-6C illustrate three different methods of locating the buckle 9 on the saddle piece 2; however, the present invention is not limited to any particular method of removably attaching the downwardly extending hanging flag 7 to the saddle piece 2.

The saddle piece 2 preferably comprises an adjustable horizontal strap 2*c* with a buckle 2*d*. When the buckle 2*d* is unfastened, the saddle piece 2 can be opened up and installed on the top of the winglet 1. Once the saddle piece 2 is installed on the winglet 1, then the buckle 2*d* is fastened to secure the saddle piece 2 on the top of the winglet 1. The length of the horizontal strap 2*c* is preferably adjustable (via the buckle 2*d*), and the strap itself is preferably elastic. The elastic nature of this strap 2*c* allows it to accommodate winglets 1 that are slightly deeper (front to back) than the saddle piece 2 itself. In the figures, the top of the winglet 1 is the same depth (front to back) as the saddle piece 2, but the winglet 1 could actually be deeper than the saddle piece by virtue of the elastic strap 2*c*. The elastic strap 2*c* also assists in maintaining a snug fit between the saddle piece 2 and the winglet 1.

Figure 3:
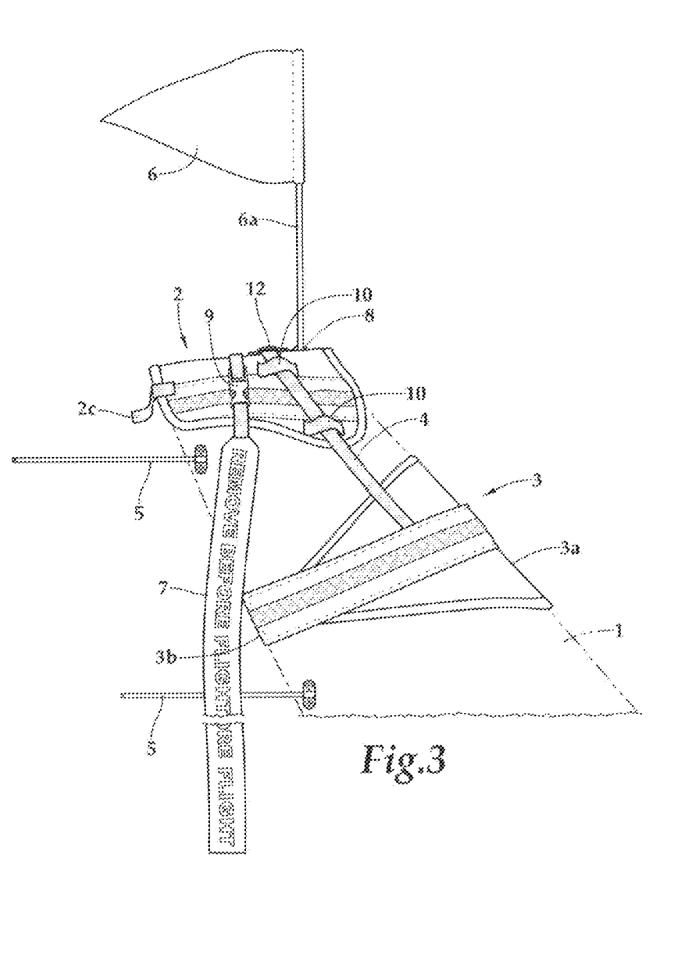
FIG. 3 is a second side view of the present invention installed on the winglet of an aircraft.

FIG. 3 is a second side view of the present invention installed on the winglet of an aircraft. As shown in this figure (and in FIG. 7), one end of the strap 4 that connects the saddle piece 2 to the anchor member 3 is preferably fixedly attached to the second side of the anchor member 3. (The first side of the anchor member is shown in FIG. 2, and the second side of the anchor member is shown in FIG. 3.) From there, the strap 4 extends upward through two loops 10 sewn onto or otherwise attached to the second side of the saddle piece 2, over the top of the saddle piece 2, and through two loops sewn onto or otherwise attached to the first side of the saddle piece 2. (The first side of the saddle piece is shown in FIG. 2, and the second side of the saddle piece is shown in FIG. 3.) The other end of the strap 3 terminates in a buckle 11. One part of the buckle 11 is attached to the end of the strap 3, and the other part of the buckle 11 is sewn onto or otherwise attached to the first side of the anchor member 3. The strap 4 and loops 10 are preferably comprised of nylon webbing.

Figure 4:
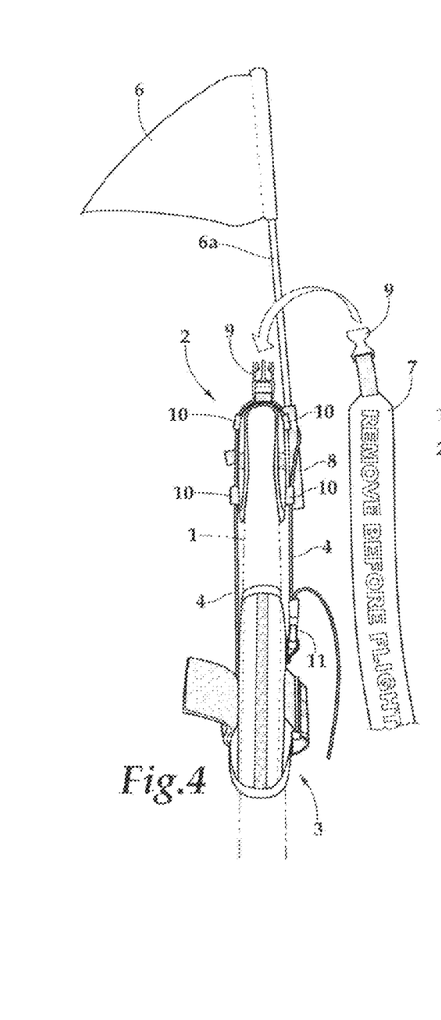
FIG. 4 is a front view of the present invention installed on the winglet of an aircraft.

FIG. 4 is a front view of the present invention installed on the winglet of an aircraft, and FIG. 5 is a rear view of the present invention installed on the winglet of an aircraft. The winglet 1 shown in these two figures has no static wicks 5 (see FIGS. 1-3). As shown in FIG. 4, the center portion of the anchor member 3 preferably comprises a neon strip with a reflective stripe so that when the anchor member 3 is installed on the winglet 1, the neon strip and reflective stripe extend vertically along the leading edge of the winglet. As shown in FIG. 5 (and also in FIGS. 7 and 8), the anchor member 3 comprises a horizontal strap 3*c* that wraps around the trailing edge of the winglet 1. The horizontal strap 3*c* is preferably comprised of a neon strip with a reflective stripe so that when the anchor member 3 is installed on the winglet 1, the neon strip and reflective stripe are visible from the rear of the aircraft.

FIGS. 6A, 6B and 6C illustrate alternate methods of attaching the downwardly extending hanging flag 7 to the saddle piece 1. As noted above, the present invention is not limited to any particular method of attaching the downwardly extending hanging flag 7 to the saddle piece 1, and the examples shown in FIGS. 6A-6C are not intended to be exhaustive. In an alternate embodiment (not shown), the downwardly extending hanging flag 7 is permanently (not removably) attached to either side of the saddle piece 2.

The embodiment shown in FIG. 6A is the embodiment shown in FIGS. 1-5. In this embodiment, the strap 4 passes through a central loop 12 (preferably comprised of nylon webbing) that is sewn onto or otherwise attached to the center of the saddle piece 2 so that the central loop 12 lies directly on top of the winglet 1 (see FIGS. 2 and 3). The central loop 12 is parallel to the loops 10 on either side of the saddle piece 2. The central loop 12 passes through one part of the buckle 9, and the other part of the buckle 9 is attached to one end of the downwardly extending hanging flag 7. The downwardly extending hanging flag 7 can be attached or removed by fastening or unfastening the buckle 9.

The embodiment shown in FIG. 6B includes the same central loop 12 as in FIG. 6A, but the central loop 12 does not pass through the buckle 9. Instead, the saddle piece 2 comprises two side loops 13, one on either side of the saddle piece 2. These side loops 13 are sewn onto or otherwise attached to the saddle piece 2, and they are oriented so that they are perpendicular to the central loop 12 and loops 10. Each of the side loops 13 passes through one part of the buckle 9. The other part of the buckle 9 is attached to one end of the downwardly extending hanging flag 7. In this manner, a downwardly extending hanging flag 7 can be attached to either side (or both sides) of the saddle piece 2.

The embodiment shown in FIG. 6C does not have the side loops 13 of the previous embodiment, but it does have a central loop 14 that is oriented perpendicularly to the central loop 12 and situated adjacent to the central loop 12 between the central loop 12 and the rear end 2*b* of the saddle piece 2. The central loop 14 preferably extends across the horizontal center (along which the central loop 12 is situated) of the saddle piece 2 and terminates on roughly the same lateral plane as the two loops 10 that are directly adjacent to the center loop 12. The central loop 14 passes through one part of the buckle 9, and the other part of the buckle 9 is attached to one end of the downwardly extending hanging flag 7. With this embodiment, the downwardly extending hanging flag 7 can be moved from one side of the saddle piece 2 to the other (by simply sliding the buckle 9 along the central loop 14)

without unfastening the buckle (which would be required in the embodiment shown in FIG. 6B).

Figures 7, 8:
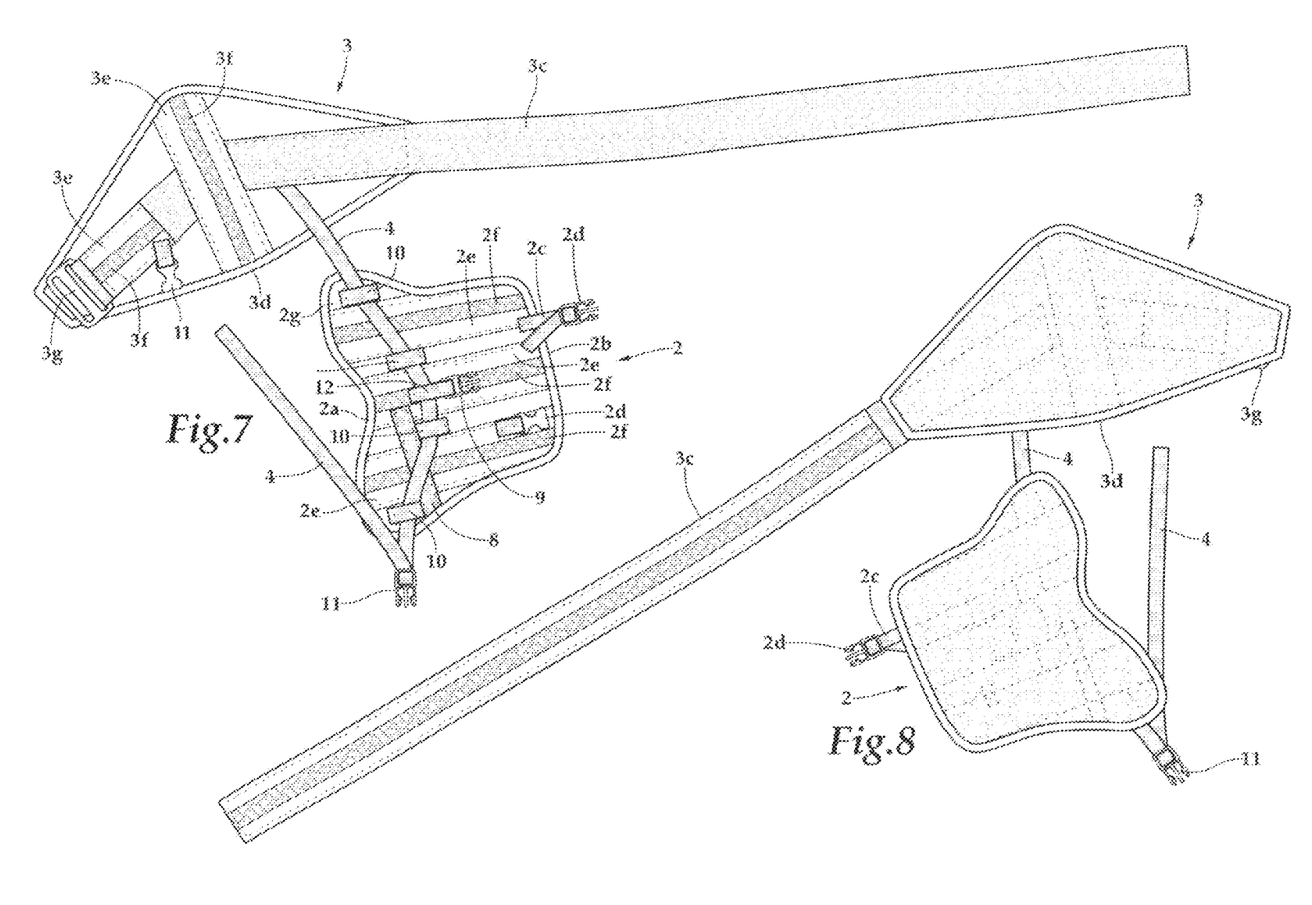
FIG. 7 is a front plan view of the saddle piece and anchor member of the present invention.
FIG. 8 is a rear plan view of the saddle piece and anchor member of the present invention.

FIG. 7 is a front plan view of the saddle piece and anchor member of the present invention, and FIG. 8 is a rear plan view of the saddle piece and anchor member of the present invention. As shown in this figure, front end 2a of the saddle piece 2 is preferably wider than the rear end 2b of the saddle piece. The front end 2a of the saddle piece 2 preferably comprises two wings 2g, each of which hugs one side of the leading edge of the tip (or top) of the winglet 1 when the invention is installed on a winglet 1 (see FIGS. 2 and 3).

The anchor member 3 is roughly triangular in shape, with a slight outward bow at the center of the top edge 3d of the anchor member. When installed on the winglet 1, this roughly triangular shape results in a greater surface area being covered by the anchor member 3 on the leading edge of the winglet 1 as compared to the trailing edge. The roughly triangular shape of the anchor member 3 also means that the front end 3a of the anchor member 3 is tapered to follow the leading edge of the winglet 1 when the anchor member 3 is installed on the winglet 1 (see FIGS. 2 and 3).

As noted above, the center portion of the anchor member comprises a neon strip 3e with a reflective stripe 3f. This neon strip 3d extends from the bow at the center of the top edge 3d to the bottom of the triangle. A neon strip 3d and reflective stripe 3f also run along the length of the horizontal strap 3c. The saddle piece 2 preferably comprises three neon strips 2e with reflective stripes 2f running along the center of each neon strip 2. These neon strips 2e and reflective stripes 2f increase the visibility of the saddle piece 2 when viewed from the side of the winglet 1; the neon strips 3e and reflective stripes 3f of the anchor member 3 are also visible from the side of the winglet 1 (see FIGS. 2 and 3).

The inside surfaces of the saddle piece 2 and anchor member 3 (shown in FIG. 8) are preferably comprised of VOLEXTRA®, an extrusion coating manufactured by Reilly Foam Corporation of Eagleville, Pa. The VOLEXTRA® extrusion coating is described by Reilly Foam Corporation as "abrasion, chemical and moisture resistant," as well as "highly durable." This material is somewhat tacky (sticky) and assists in holding the apparatus to the winglet 1. This material also prevents the saddle piece 2 and anchor member 3 from riding upwards on the winglet 1. In addition, this material facilitates the distribution of pressure across the entire surface of the anchor member 3.

To install the present invention on a winglet 1, one first fits the tapered front end 3a of the anchor member 3 to the leading edge of the winglet 1. Next, the saddle piece 2 is placed over the top of the winglet 1 and the rear end 2b of the saddle piece 2 secured by adjusting the horizontal strap 2c. Positioning of the saddle piece 2 on the apex of the winglet 1 optimizes the visibility of the top point of the winglet 1 and provides for the most accurate fall line for the downwardly extending hanging flag 7. The inside surface of the strap 3c (shown in FIG. 7) is preferably comprised of a hook-and-loop fastener. This hook-and-loop fastener allows the width of the anchor member to be adjusted to accommodate different sizes (that is, depth and width) of winglets. Next, the horizontal strap 3c is passed through the buckle 3g on the anchor member 3, folded over onto itself, and secured with the hook-and-loop fastener.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for increasing the visibility of an aircraft winglet comprising:
    (a) a saddle piece configured to lit on top of a winglet, the saddle piece comprising a horizontal strap configured to fit around a trailing edge of the winglet when the saddle piece is installed on the winglet;
    (b) an anchor member comprising a horizontal strap configured to fit around a trailing edge of the winglet when the anchor member is installed on the winglet; and
    (c) an adjustable strap connecting the saddle piece to the anchor member;
    wherein the anchor member is situated on the winglet a certain distance below the saddle piece, wherein there is a vertical distance between the saddle piece and the anchor member, and wherein the adjustable strap adjusts the vertical distance between the saddle piece and the anchor member.

2. The apparatus of claim 1, wherein the horizontal strap on the saddle piece is both adjustable and elastic.

3. The apparatus of claim 1, wherein the saddle piece further comprises a vertical pocket, and wherein the apparatus further comprises an upwardly extending stick flag having a shaft that fits into the vertical pocket.

4. The apparatus of claim 1, further comprising a downwardly extending hanging flag that is attached to the saddle piece.

5. The apparatus of claim 1, further comprising a downwardly extending hanging flag that is removably attached to the saddle piece.

6. The apparatus of claim 1, wherein the adjustable strap comprises a first end and a second end;
    wherein the saddle piece comprises a top, a first side and a second side;
    wherein the anchor member comprises a first side and a second side;
    wherein the first end of the adjustable strap is fixedly attached to the second side of the anchor member;
    wherein the adjustable strap extends upward through one or more loops attached to the second side of the saddle piece, over the top of the saddle piece, and through one or more loops attached to the first side of the saddle piece;
    wherein the second end of the adjustable strap terminates in a buckle;
    wherein the buckle comprise a first part and a second part; and
    wherein the first part of the buckle is attached to the second end of the adjustable strap, and the second part of the buckle is attached to the first side of the anchor member.

7. The apparatus of claim 1, wherein the anchor member comprises a center portion:
    wherein the center portion of the anchor member comprises a neon strip with a reflective stripe configured so that when the anchor member is installed on the winglet, the neon strip and reflective stripe extend vertically along a leading edge of the winglet.

8. The apparatus of claim 1, wherein the horizontal strap of the anchor member is comprised of a neon strip with a reflective stripe configured so that when the anchor member is installed on the winglet of an aircraft with a front and a rear, the neon strip and reflective stripe are visible from the rear of the aircraft.

9. The apparatus of claim 1, wherein the saddle piece comprises a front end and a rear end, and wherein the front end of the saddle piece is wider than the rear end of the saddle piece.

10. The apparatus of claim 9, wherein the front end of the saddle piece comprises two wings, wherein the winglet comprises a top with a leading edge, and wherein each wing hugs a side of the leading edge of the top of the winglet when the apparatus is installed on the winglet.

11. The apparatus of claim 1, wherein the anchor member is roughly triangular in shape.

12. The apparatus of claim 11, the anchor member having a top edge with a center, wherein the anchor member comprises an outward bow at the center of the top edge of the anchor member.

13. The apparatus of claim 12, the triangular shape of the anchor member having a bottom point, wherein the anchor member further comprises a neon strip with a reflective stripe that extends from the outward bow at the center of the top edge of the anchor member to the bottom point of the triangular shape of the anchor member.

14. The apparatus of claim 1, wherein the saddle piece comprises three neon strips with reflective stripes, one strip being positioned horizontally on a first side of the saddle piece, one strip being positioned horizontally on a second side of the saddle piece, and one strip being positioned along a center of the saddle piece.

15. The apparatus of claim 1, wherein the saddle piece and anchor member each comprises an inner surface, and wherein the inner surfaces of the saddle piece and anchor member are comprised of an extrusion coating that is abrasion-resistant, chemical-resistant and moisture-resistant.

16. The apparatus of claim 1, wherein the horizontal strap of the anchor member comprises a hook-and-loop fastener that allows the length of the horizontal strap to be adjusted.

\* \* \* \* \*